United States Patent [19]

Moertel

[11] Patent Number: 4,718,150

[45] Date of Patent: Jan. 12, 1988

[54] PROJECTION COOLING OF MOLDED SLIDE FASTENER ELEMENTS AND PRODUCT

[75] Inventor: George B. Moertel, Conneautville, Pa.

[73] Assignee: Talon, Inc., Meadville, Pa.

[21] Appl. No.: 193,057

[22] Filed: Oct. 2, 1980

[51] Int. Cl.$^4$ .................. A01B 19/10; B29D 29/00
[52] U.S. Cl. ........................................ 24/427; 24/415
[58] Field of Search ............. 24/205.1 R, 205.11 R, 24/205.13 R, 205.13 D, 205.16 R, 427, 415

[56] References Cited

U.S. PATENT DOCUMENTS

| | | | |
|---|---|---|---|
| 2,041,558 | 5/1936 | Marinsky | 24/205.13 R |
| 2,161,329 | 6/1939 | Wittenberg | 24/205.13 R |
| 2,233,305 | 2/1941 | Burgeni | 24/205.13 R |
| 3,022,560 | 2/1962 | Morin | 24/205.15 |
| 3,100,325 | 8/1963 | Morin | 24/205.1 |
| 3,955,247 | 5/1976 | Takamatsu | 24/205.13 D |
| 4,037,295 | 7/1977 | Rojaln et al. | 24/205.13 D |
| 4,080,691 | 3/1978 | Moertel | 24/205.1 R |
| 4,157,603 | 6/1979 | Kowalski | 24/205 R |
| 4,231,138 | 11/1980 | Moertel | 24/205.16 R |
| 4,263,698 | 4/1981 | Moertel | 24/205.13 R |
| 4,290,175 | 9/1981 | Moertel | 24/205.16 R |
| 4,290,176 | 9/1981 | Wulz | 24/205.13 R |

*Primary Examiner*—Paul J. Hirsch
*Attorney, Agent, or Firm*—Anthony A. O'Brien

[57] ABSTRACT

In a stringer for a slide fastener wherein coupling elements are molded on longitudinal supporting means, such as an edge of a tape or spaced connecting threads, leg portions of the coupling elements are formed with recesses to define rapidly cooled portions which are molded to the supporting means. The rapidly cooled portions eliminate porosity to produce greater adherence and strength of the polymer bonding the coupling elements to the supporting means as well as reducing cost.

8 Claims, 36 Drawing Figures

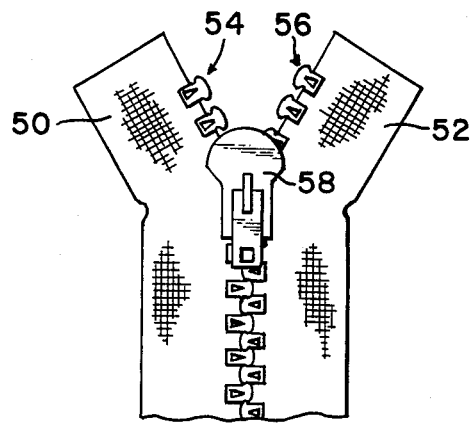
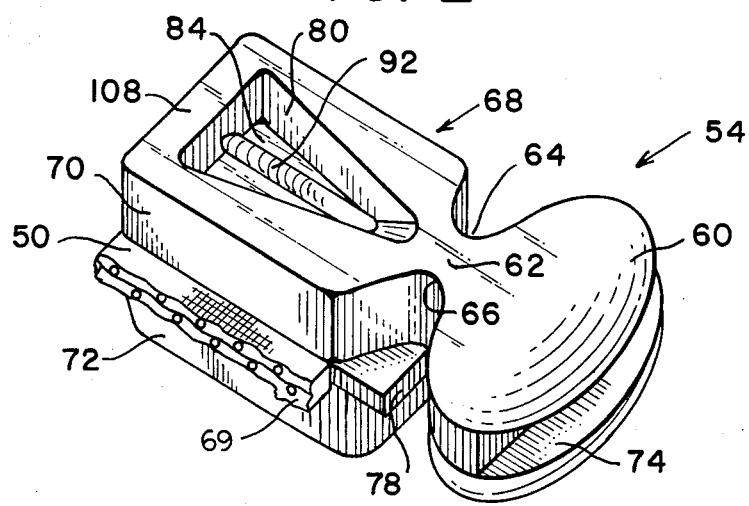
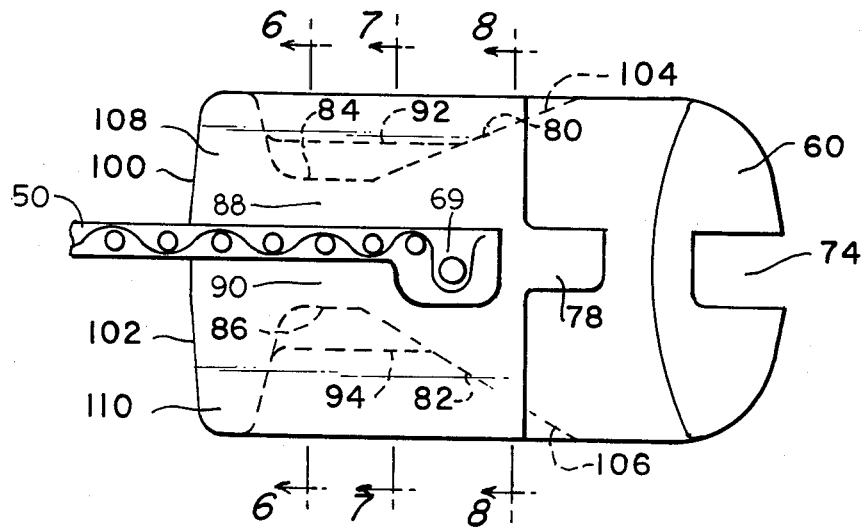

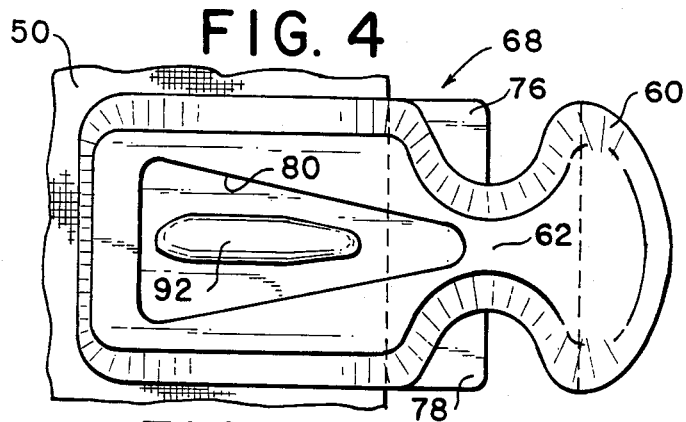
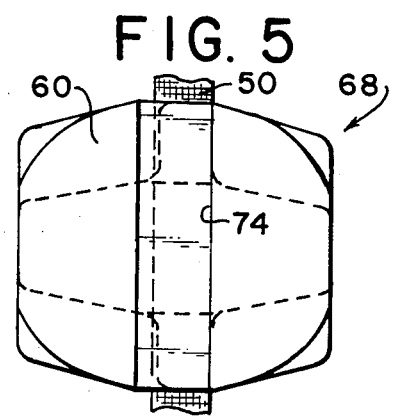
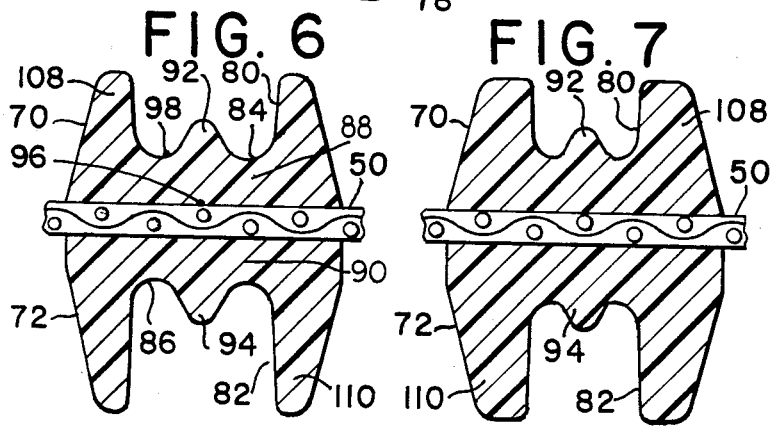
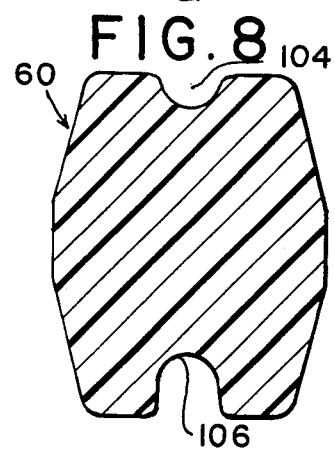
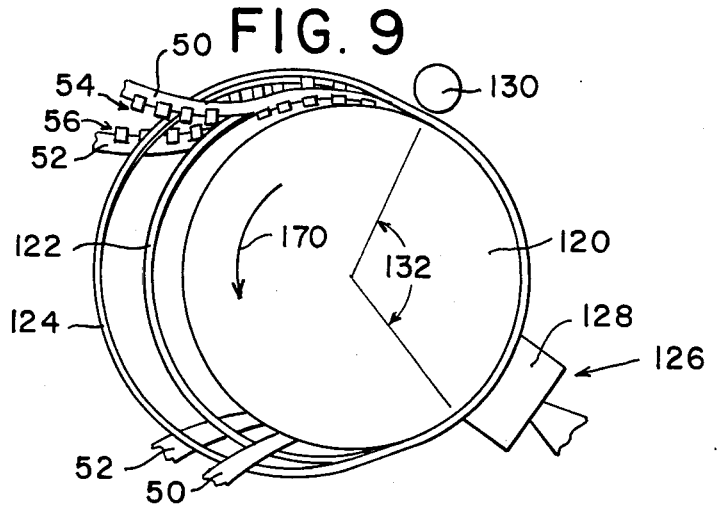
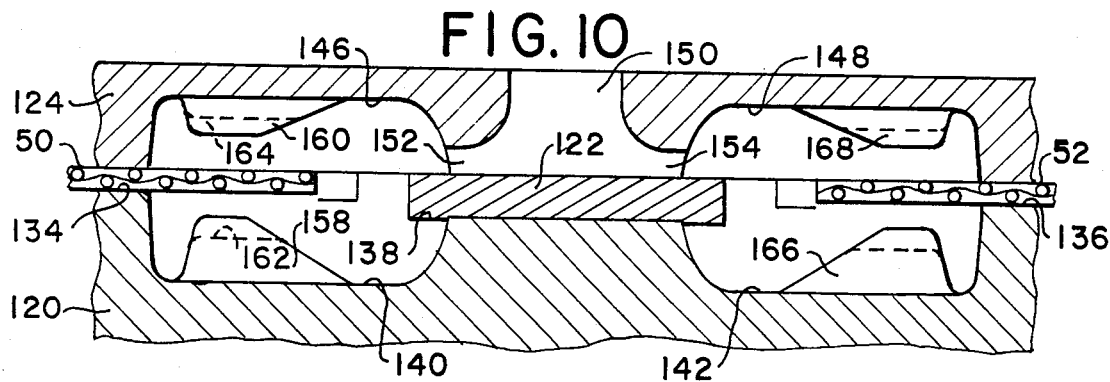

PROJECTION COOLING OF MOLDED SLIDE FASTENER ELEMENTS AND PRODUCT

TECHNICAL FIELD

The present invention relates to slide fasteners and their manufacture, and particularly to stringers with slide fastener coupling elements injection molded on supporting members and methods of manufacturing the same.

DESCRIPTION OF THE PRIOR ART

The prior art, as exemplified in U.S. Pat. Nos. 1,022,560, 3,100,325, 4,080,691 and 4,157,603, contains slide fasteners having coupling elements injection molded directly onto supporting members. Prior art slide fastener elements injection molded onto supporting members are sometimes subject to being pulled from the supporting members or otherwise failing and becoming broken. It is disclosed in the prior art to provide apertures in central portions of the elements overlying the tape to permit stitching threads to aid in securing the elements on the tape, to provide embossing recesses of different shapes to distinguish right hand stringers from left hand stringers, to provide grooves between wing portions on one side of slide fastener elements to facilitate the bending of the wing portions to their horizontal position, and to provide openings or recesses in inside surfaces of folded leg portions adjacent supporting threads for receiving mating projections on the opposite leg portions to reinforce the security of supporting threads embedded in the leg portions.

SUMMARY OF THE INVENTION

The invention is summarized in a stringer for a slide fastener including longitudinal supporting means, a plurality of coupling elements injection molded on spaced portions of the supporting means, each of the plurality of coupling elements including a head portion and at least one leg portion molded on the respective spaced portion of the supporting means to secure each coupling element to the supporting means, each of the at least one leg portions including a recess formed in an outside surface thereof to form a recessed surface extending adjacent the supporting means and defining a rapidly cooled portion of each at least one leg portion bordered by the recessed surface and molded on the supporting means, and the rapidly cooled portions having a thickness which is less than 60° of the maximum thickness of the at least one leg portions.

An object of the invention is to produce substantially increased strength of attachment between injection molded fastening elements and supporting members on which the fastening elements are molded.

Another object of the invention is to decrease the cost of materials in forming slide fasteners by reducing the amounts of polymer resin employed in making individual slide fastener elements without substantially deteriorating the strength of the elements.

One advantage of the invention is that recesses formed in outside surfaces of leg portions of coupling elements substantially increase the surface area of the leg portions to greatly increase the strength per cross-sectional area of the leg portions.

One feature of the invention is that recesses formed in outside surfaces of leg portions of coupling elements substantially reduce porosity and sinks in the leg portions to produce increased strength per unit volume of the leg as well as increased strength of attachment of the leg to the supporting member.

Other objects, advantages and features of the invention will be apparent from the following description of the preferred embodiment taken in conjunction with the accompanying drawings.

BRIEF DESCRIPTION OF THE DRAWINGS

FIG. 1 is a plan view of a slide fastener, partially broken away, manufactured in accordance with the invention.

FIG. 2 is a perspective view of one coupling element and supporting tape portion broken away from the slide fastener of FIG. 1.

FIG. 3 is a side view of the coupling element and supporting tape portion of FIG. 2.

FIG. 4 is a plan view of the coupling element of FIGS. 2 and 3.

FIG. 5 is an end view taken toward the head of the coupling element of FIGS. 2–4.

FIG. 6 is a cross-section view taken at line 6—6 in FIG. 3.

FIG. 7 is a cross-section view taken at line 7—7 in FIG. 3.

FIG. 8 is a cross-section view taken at line 8—8 in FIG. 3.

FIG. 9 is a diagrammatic elevation view of an apparatus for manufacturing a pair of slide fastener stringers of the slide fastener of FIG. 1.

FIG. 10 is an enlarged cross-section view of a broken-away portion of a molding wheel and inner and outer bands of the apparatus of FIG. 9.

DESCRIPTION OF THE PREFERRED EMBODIMENTS

Figure 11:
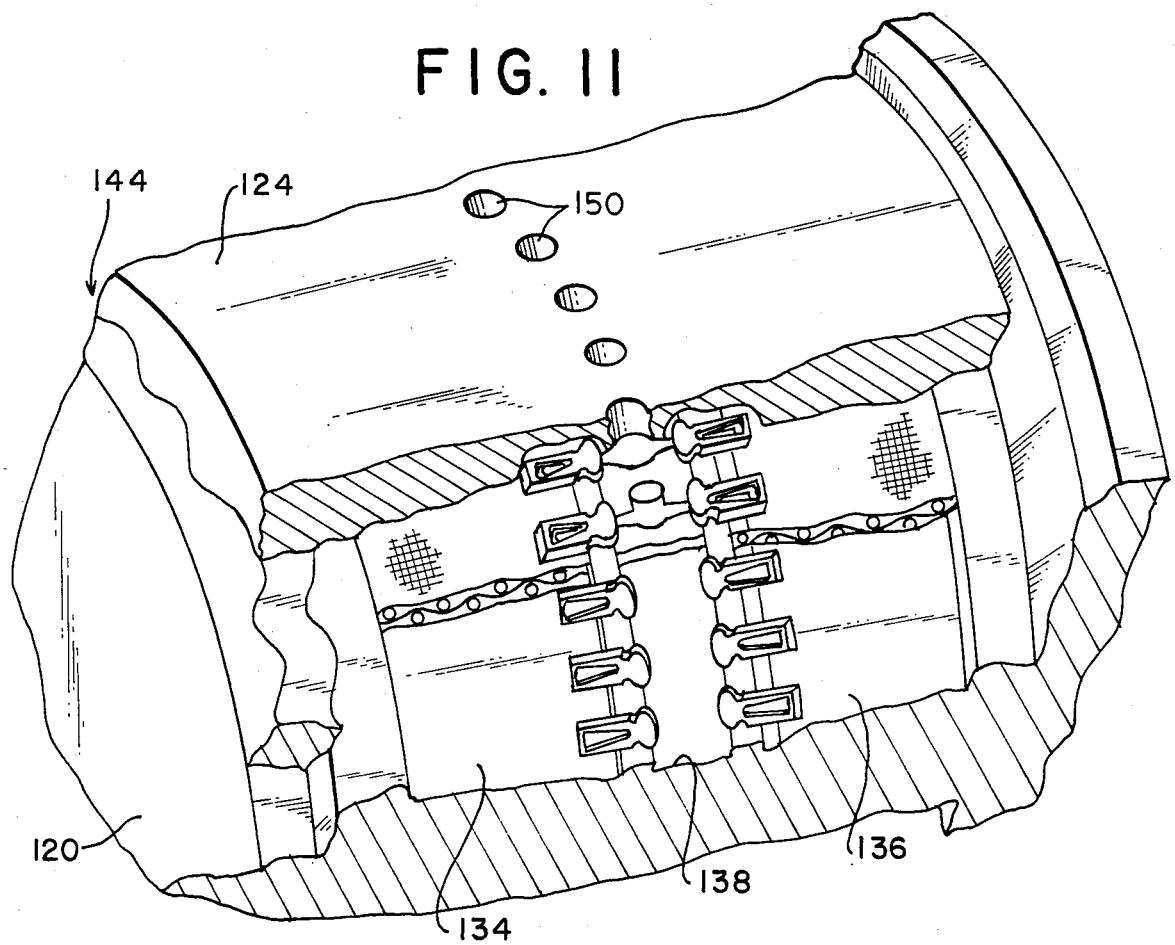
FIG. 11 is a perspective view of a broken-away portion of the molding wheel and inner and outer bands of FIGS. 9 and 10.

As illustrated in FIG. 1, a slide fastener manufactured in accordance with the invention includes a pair of coplanar support tapes 50 and 52 having rows of injection molded interlocking coupling elements indicated generally at 54 and 56 attached to the inner edges of the respective tapes 50 and 52. A slider 58 is slideably positioned on the rows of coupling elements 54 and 56 for disengaging and reengaging the coupling elements 54 and 56 by sliding movement therealong. The tape 50 and elements 54 form a left stringer, while the tape 52 and elements 56 form a right stringer as viewed in FIG. 1. The left and right stringers with the coupling elements 54 and 56 are substantially mirror images of each other. The tapes 50 and 52 are conventional tapes, such as textile tapes of nylon, polyester, etc. The coupling elements 54 and 56 are formed from a polymer resin such as one of the thermoplastic resins e.g. nylon 6, nylon 6—6, acetal, polybutylene terephthalate, etc. For sake of brevity only the left stringer with the coupling elements 54 is described in detail and illustrated in FIGS. 2–8.

Each of the coupling elements 54 includes a head portion 60, a narrowed neck portion 62 defined by recesses 64 and 66 on opposite sides of the element 54, and a body portion indicated generally at 68 which is molded directly onto an elongated supporting means such as the inner edge of the tape 50 which may include a beaded portion 69. The body 68 has an upper leg 70 and a lower leg 72 adherently attached by the injection molding on respective upper and lower sides of the inner edge portion of the tape 50. A groove 74 is formed in the top of each head portion 60 and tongues or tabs 76 and 78 extend from the body portion 68 into the recesses 64 and 66, respectively, for engaging in grooves formed in the head portions of opposing coupling elements 56; the grooves 74 of the elements 54 receive similar tongues of the opposing elements for maintaining the elements 54 and 56 in a common plane when the elements are interlocked. A more detailed description of the head portions and neck portions of the slide fastener elements of FIGS. 1–8 can be found in U.S. patent application Ser. No. 154,649 filed May 30, 1980.

The legs 70 and 72 have respective recesses 80 and 82 which define recessed surfaces 84 and 86 forming portions 88 and 90 of substantially reduced thickness, relative to the thickness of the legs 70 and 72 extending perpendicular to the tape 50, between the recessed surface 84 and the tape 50 and the recessed surface 86 and the tape 50, respectively. The reduced portions 88 and 90 are cooled much more rapidly during the injection molding than substantially thicker portions of legs which do not have the recesses 84 and 86, as in the prior art. It is found that these rapidly cooled portions of reduced thickness result in substantially increased strength of adherence between the supporting member 50 and the injection molded coupling element 54 with surprisingly little if any reduction in the strength of the legs. Examination of cut cross-sections of leg portions without such recesses reveals that central portions contiguous the tapes are porous and contain voids which substantially reduce the contact and adherence of the polymer to the tape. Areas wherein the cross section has been cooled rapidly, i.e. the skin or the area adjacent the outer surfaces of the coupling element engaging the cavity walls, posses substantially less porosity and are considerably more dense. The porosity is believed to result from shrinkage of the polymer during cooling, particularly after the injection pressure has been terminated. Sinks, pits, or other surface irregularities on the outer surfaces of the coupling elements are often observed on prior art coupling elements and are believed attributable to the shrinkage of the polymer during cooling. The tape 50 acts as an insulator and inhibits cooling of the polymer in central portions of the legs 70 and 72 contiguous the tape. The rapidly cooled reduced thickness portions 88 and 90 have substantially less porosity than legs without recesses and exhibit substantially less sinking and pitting of the outer surfaces. The recesses 80 and 82 result in a substantially greater amount of surface on the leg portions 70 and 72 to produce a substantially greater amount of skin contiguous these exposed exterior surfaces. The relatively denser skin areas of the polymer have much greater strength than the more porous interior areas; thus the substantially reduced cross-sectional area of the polymer resulting from the recesses 80 and 82 does not produce a proportional decrease in strength of the leg portions; rather the leg portions with the recesses 80 and 82 show little if any deterioration in overall strength because of increase in skin.

In order to exhibit substantial increase in the strength of attachment to the tapes 50, the thickness of the portions 88 and 90 must be reduced to less than generally about 60% of the maximum thickness of the legs 70 and 72 extending perpendicular to the tape 50. Preferably the thickness of the portions 88 and 80 is reduced to less than about 30% of the overall leg thickness extending from the tape 50. The thickness 88 and 90 must be greater enough that the polymer during injection readily flows to contact and penetrate into the tape 50; otherwise poor adhesion results. Also some thickness of the portions 88 and 90 is necessary in order to maintain the strength of the legs 70 and 72.

Ridges 92 and 94 are formed on the recessed surfaces 84 and 86 centrally within the recesses 80 and 82. It is noted that the ridges further increase the amount of surface of the legs as well as adding to the quantity of polymer. Thus the ridges 92 and 94 add substantially to the strength of the legs 70 and 72 both because of the increased skin as well as the increase in cross-sectional area in the leg. Further the ridges 92 and 94 are formed such that the distance from any point on the tape surface 50 to an external surface is not greatly increased, i.e. the distance from a point 96, FIG. 6, in the center of an engaged surface of the tape 50 to a bottom point 98 on the surface 84 adjacent the ridge 92 is not much greater than the minimum thickness of the portion 88 if the ridge 92 were absent. Thus rapidly cooled ridges 92 and 94 on the recessed surfaces 84 and 86 produce surprisingly large increases in strength of the legs 70 and 72 without increasing the voids or porosity in the polymer contacting the tape which would deteriorate the strength of adherence to the tape 50.

The recesses 80 and 82 are generally in the shape of an isosceles triangle with the apex extending to the neck portions 62 and the base of the triangle adjacent heels 100 and 102 of the legs 70 and 72. The bottom surfaces 84 and 86 of the recesses 80 and 82 have forward portions 104 and 106 which slope upwardly from points intermediate the base and apex of the recesses to the apex of the recess at the neck portion 62 of the fastening elements. The shape of the recesses 80 and 82 results in walls 108 and 110 extending the full height or thickness of the legs 70 and 72 from the tape 50 and surrounding the recesses 80 and 82. However, these walls have greatly reduced thickness in dimensions parallel to the tape 50; this thickness being reduced to less than at least 30% of the overall dimension of the legs in the same direction. Further it is noted that the thickness of the ridges 92 and 94 is maintained with this overall reduced thickness in a direction parallel to the longitudinal direction of the tape 50. These walls, rapidly cooled by cooled cavity surfaces during molding exhibit greater strength and increased skin area to maintain the overall strength of the leg portion in spite of the reduced cross-sectional area.

Forming the recesses 80 and 82 in the legs 70 and 72 results in other significant advantages. The quantity of polymer required to produce the coupling elements 54 and 56 of the slide fastener is substantially reduced resulting in less cost for the materials forming the slide fastener. Further, the coupling elements are cooled to a solidified condition in the molding apparatus at a substantially increased rate; this permits a much greater speed in the molding apparatus to produce larger quantities of slide fastener chain per unit of time. The greater rate of production of slide fastener permits less investment and operating cost in manufacturing equipment. Thus the present slide fastener stringers are less costly in addition to having greater strength.

Figure 12:
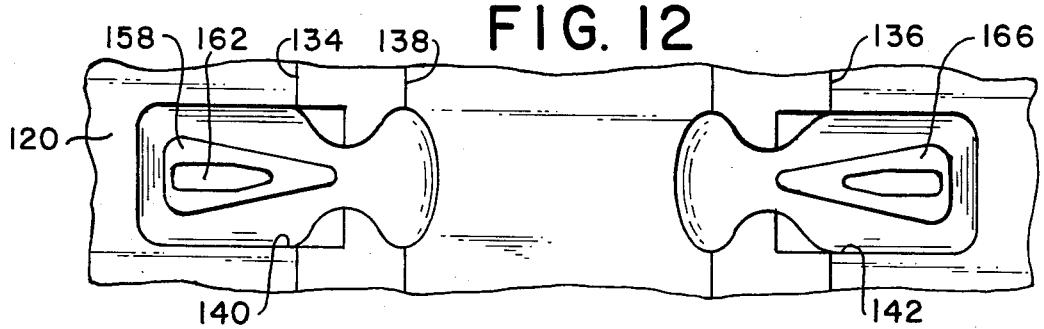
FIG. 12 is a plan view of a broken-away portion of a cavity wheel surface of the apparatus of FIGS. 9–11.
Figure 13:
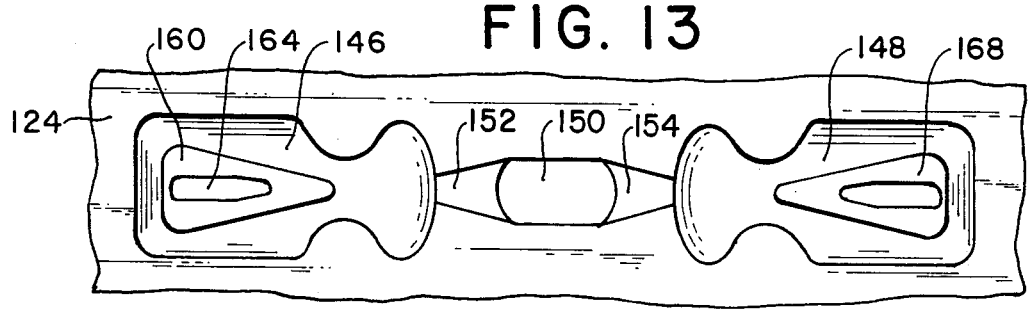
FIG. 13 is a plan view of a broken-away portion of the inner surface of an outer band of the apparatus of FIGS. 9–11.

As illustrated in FIG. 9, an apparatus for injection molding the coupling elements 54 and 56 on the tapes 50 and 52 includes a cavity wheel 120, an inner band 122 extending around the cavity wheel 120, an outer band 124 extending around the inner band 120 and the cavity wheel 120, and an injection mechanism indicated generally at 126 including a shoe 128 which with a roller 130 forces the outer band 124 and inner band 122 against the cavity wheel 120 within an angle of engagement 132. As shown in FIGS. 10–12, the cavity wheel 120 has a pair of annular channels 134 and 136 around its periphery for receiving the tapes 50 and 52. An annular channel 138 is formed around the periphery of the cavity wheel 120 for receiving the inner band 122. A pair of rows of cavity portions 140 and 142 are formed in the periphery of the cavity wheel 120 for forming the bottom portions 72 of the coupling elements 54 and 56. The inside surface of the band 124, FIG. 13, includes a pair of rows of cavity portions 146 and 148 for forming the upper portions 70 of the coupling elements 54 and 56. The outer band 124 also includes a row of openings 150 formed therethrough which have gate portions 152 and 154 opening into the cavity portions 146 and 148. Means indicated generally at 144 are provided on the outer band 124 and the cavity wheel 120 for maintaining the outer band 124 and the cavity portions 146 and 148 aligned with the cavity wheel 120 and the respective cavity portions 140 and 142. A more detailed description of a molding apparatus can be found in U.S. patent application Ser. No. 154,650 filed May 30, 1980.

The present apparatus includes projections 158 of the cavity wheel 120 extending upward from bottoms of the cavities 140 for forming the recesses 82 in the lower portion 72 of the coupling elements 54, and includes projections 160 of the outer band 124 extending from bottoms of the cavity portions 146 for forming the recesses 80 in the upper portions 70 of the coupling elements 54. Similar projections 166 and 168 are formed extending from the bottom of the cavities 142 and 148 for forming substantially identical recesses in the coupling elements 56. The projections 158 and 160 include channels 162 and 164 formed in their surfaces closest to the tape 50 for forming the ridges 94 and 92 of the fastener elements 54. The cavity wheel 120 as well as the bands 122 and 124 are formed from suitable metals which are heat conductive and maintained at a temperature substantially below the melting temperature of the polymer.

In operation of the apparatus of FIGS. 9–13 and practice of the method of the invention, the cavity wheel 120 is rotated in the direction as shown by the arrow 170 along with the inner band 122 and the outer band 124. Tapes 50 and 52 are fed into the tape receiving channels 134 and 136, respectively, prior to where the outer band 124 engages the periphery of the cavity wheel 120. After engagement of the bands 124 and 122 with the cavity wheel, the outer band 124 is engaged by the shoe 128 of the injection means 126 which applies pressurized molten thermoplastic resin to the openings 150 underneath the shoe 128. This causes molten thermoplastic to flow through the openings 150 and the gates 152 and 154 into the fastening element cavities formed by cavity portions 146 and 148 in the band 124 and cavity portions 140 and 142 formed in the cavity wheel 120. The molten polymer engaging the surfaces of the bands 122 and 124 and the cavity wheel 140 cools and solidifies. The projections 158, 160, 166 and 168 cause more rapid cooling of the molten polymer in areas of the leg portions over the tape 50 and 52. This rapid cooling produces the increased strength and adherence of the polymer in the coupling elements to the tapes. Channels 162 and 164 formed in the projections aid in directing the flow of molten polymer to insure adequate penetration of the polymer into the tapes 50 and 52 as well as complete formation of the coupling elements. After the polymer is solidified, the bands 122 and 124 separate from the cavity wheel 120 permitting the gate stubs formed within the opening 150 and the gates 152 and 154 to be severed and the stringers to be removed from the cavity mechanism as shown in FIG. 9.

Figure 14:
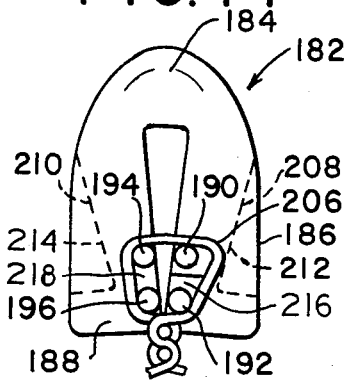
FIG. 14 is a cross-section view of a broken-away portion of one stringer of another variation of the slide fastener in accordance with the invention.
Figure 15:
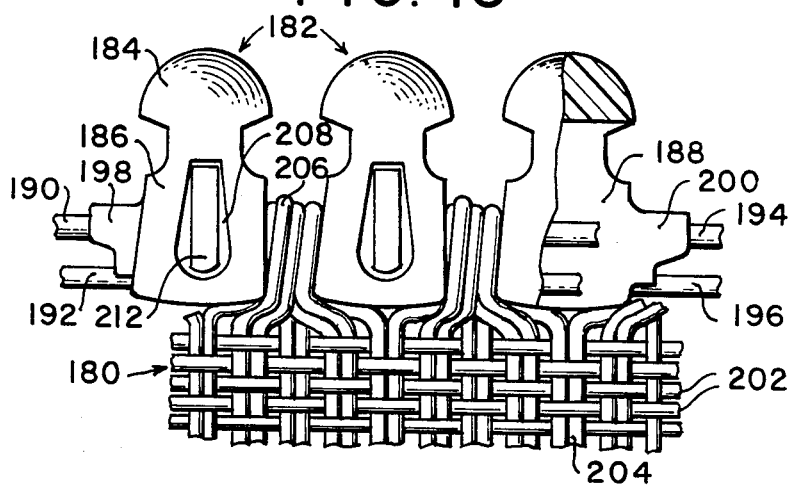
FIG. 15 is a plan view of the broken-away portion illustrated in FIG. 14.
Figure 16:
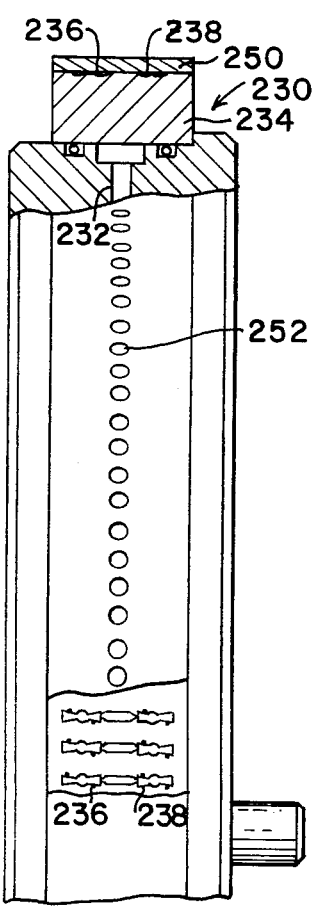
FIG. 16 is an elevation view, partially shown in section, of a broken-away portion of a modified injection molding apparatus for forming a pair of slide fastener stringers in accordance with the variation illustrated in FIGS. 14 and 15.
Figure 17:
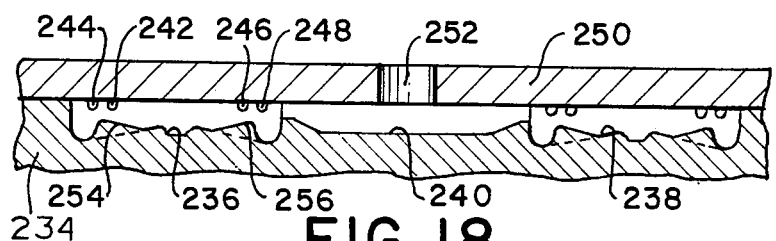
FIG. 17 is an enlarged sectional view of a broken-away portion of a cavity wheel and band of the modified apparatus of FIG. 16.
Figure 18:
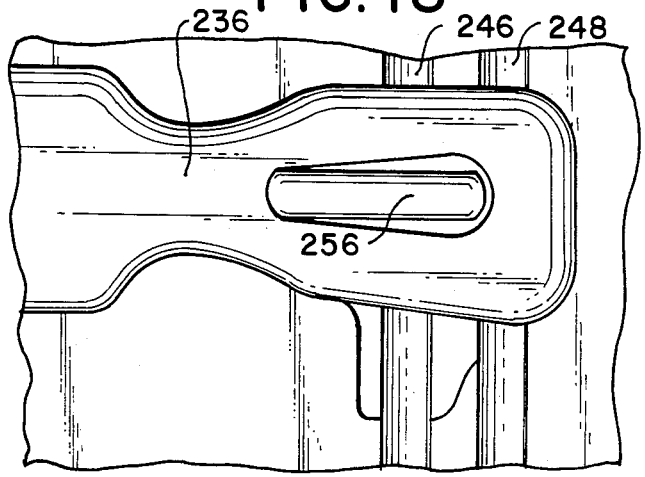
FIG. 18 is an enlarged plan view of a broken-away portion of the cavity wheel surface of the apparatus of FIGS. 16 and 17.
Figure 19:
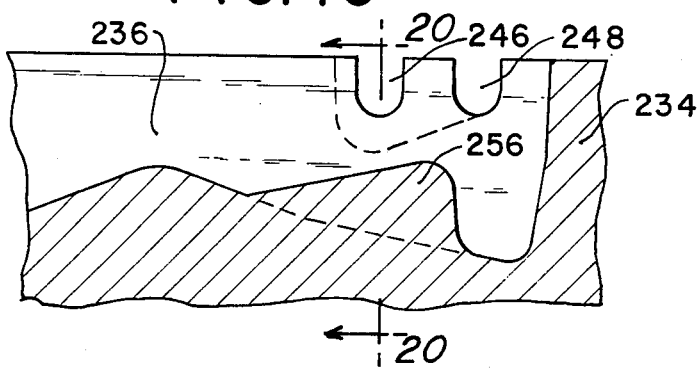
FIG. 19 is an enlarged section view of the broken-away portion of the cavity wheel shown in FIG. 18.
Figure 20:
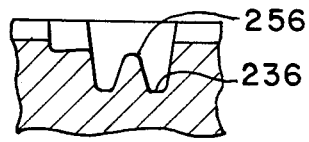
FIG. 20 is a cross-section view taken at line 20—20 in FIG. 19.

A modified stringer illustrated in FIGS. 14 and 15 includes a woven tape indicated generally at 180 carrying a plurality of coupling elements indicated generally at 182 on the inner edge thereof. Each of the coupling elements 182 includes a head portion 184 and a pair of leg portions 186 and 188 extending in generally the same direction from opposite sides of the head portion 184. A pair of spaced connecting threads 190 and 192 extend longitudinally in the edge of the tape 180 and have spaced portions imbedded in the leg portions 186 adjacent the interior surface thereof, and a pair of spaced connecting threads 194 and 196 extend longitudinally in the edge of the tape 180 and have spaced portions imbedded in the leg portions 188 adjacent the interior surface thereof. Reinforcing projections 198 and 200 extend from each pair of leg portions 186 and 188, respectively, along the connecting threads 190 and 194. The bottom surfaces of the projections 198 and 200 are formed at a slant or incline toward the heels of the leg portions 186 and 188 for permitting flexing of the lower connecting threads 192 and 196. The tape 180 includes a plurality of parallel warp threads 202 which are interwoven by a weft thread 204. Loops 206 or segments of the weft thread are looped around the connecting threads 190, 192, 194 and 196 and projections 198 and 200 between each of the coupling elements 182 to secure the coupling elements 182 in the edge of the tape. The connecting threads 190, 192, 194 and 196 form supporting means upon which the legs of the coupling elements are molded. A more detailed description of a similar stringer, except for the recesses in the legs, can be found in U.S. patent application Ser. No. 073,963 filed Sept. 10, 1979.

The present stringer illustrated in FIGS. 14 and 15 differs from the slide fastener described in the prior application by including recesses 208 and 210 formed in outer surfaces of the respective leg portions 186 and 188. Recesses 208 and 210 define recessed surfaces 212 and 214 which in turn define rapidly cooled portions 216 and 218 between the recessed surfaces 212 and 214 and inside surfaces of the legs 186 and 188. The connecting threads 190, 192, 194 and 196 are imbedded within these rapidly cooled portions. The rapidly cooled portions 216 and 218 have thicknesses generally at least less than 60% of the overall thickness of the leg portions perpendicular to the tape at the connecting threads 190, 192, 194 and 196. These rapidly cooled portions result in substantially greater adherence of the polymer resin of the leg portions 186 and 188 to the connecting threads 190, 192, 194 and 196 in the same manner as the recesses in the embodiments of FIGS. 1–8 result in greater adherence of the coupling elements to the opposite sides of the tape.

An apparatus for molding a pair of trains of coupling elements, in flattened form, is illustrated in FIGS. 16–20 and includes a cavity wheel 230 formed with interior passages 232 for providing for flow of a cooling liquid such as water, and with an outer member 234 having rows of cavities 236 and 238 formed around the periphery thereof and covered by a band 250. Annular grooves 242, 244, 246 and 248 are also formed in the periphery of the outer member 234 intersecting leg forming portions of the coupling element cavities 236 for receiving the connecting threads 190, 192, 194 and 196. Similar annular grooves intersect the cavities 238. A row of injection runners 240 is formed between the rows of cavities 236 and 238 with opposite ends of the runners 240 being narrowed to form gates into the respective cavities 236 and 238. Openings 252 are formed in the band for permitting flow of molten thermoplastic from an injection shoe into the runners 240 and hence into the cavities 236 and 238. Projections 254 and hence into the cavities 236 and 238. Projections 254 and 256 extend from center portions upward into the leg forming portions of the cavity 236 for providing for rapid cooling of the rapidly cooled portions 216 and 218 adjacent the connecting threads 190, 192, 194 and 196. Similar projections extend into the cavites 238.

In operation of the apparatus of FIGS. 16–20 and process of manufacturing the stringer of FIGS. 14 and 15, the connecting threads 190, 192, 194 and 196 are fed to the respective grooves 242, 244, 246 and 248 in the cavity wheel 230 prior to the band 250 engaging the cavity wheel. After the band 250 is brought into engagement with the periphery of the cavity wheel, thermoplastic is injected through the openings 252 in the band 250 into the runners 240 and hence into the cavities 236 and 238. The projections 254 and 256 in the cavities 236 form the rapidly cooled portions 216 and 218 in the legs 186 and 188 of the coupling elements to produce improved adherence of the polymer to the connecting threads 190, 192, 194 and 196.

After the coupling elements have solidified, they are removed from the cavity wheel 230 and subsequently folded into a U-shape as illustrated in FIG. 14. Thereafter the coupling elements 182 connected in a train by the connecting threads 190, 192, 194 and 196 are fed to loom which weaves the tape 180 with the train of coupling elements 182 woven in the edge of the tape 180 during the weaving.

Figure 21:
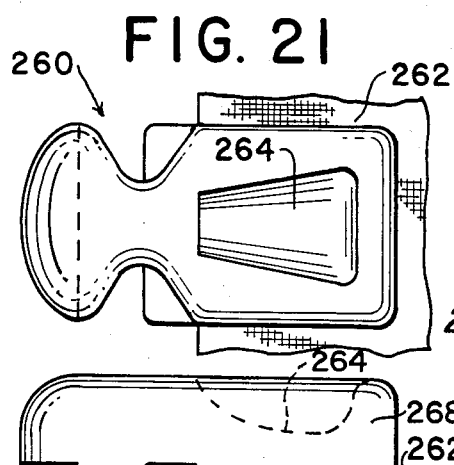
FIG. 21 is a plan view of a broken-away portion of one stringer of a third variation of a slide fastener stringer in accordance with the invention.
Figure 22:
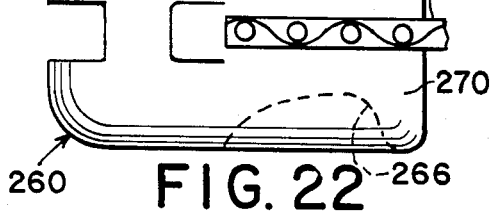
FIG. 22 is a side view of the broken-away portion of FIG. 21.

A modified stringer for slide fasteners, as shown in FIGS. 21 and 22, includes coupling elements 260 molded on an inner edge of a tape 262. The elements 260 are similar to the elements 54 and 56 of the embodiment illustrated in FIGS. 1–8, but have recesses 264 and 266 formed in respective legs 268 and 270 of the coupling elements which are absent center ridges. It is noted that the coupling elements 182 of FIGS. 14 and 15 similarly have recesses without ridges on the recessed surfaces. The ridges are particularly desirable in elements of larger sizes while elements of smaller sizes are formed without ridges in the recesses. The recesses 264 and 266 of the coupling element 260 of FIGS. 21 and 22 from rapidly cooled portions between recessed surfaces defined by the recesses and the tape 262 to form more adherent bonding to the tape.

Figure 23:
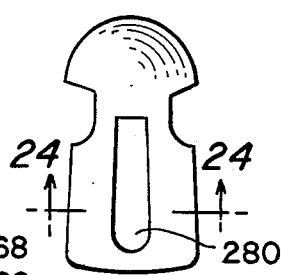
FIG. 23 is a plan view of a coupling element broken away from a fourth variation of a slide fastener in accordance with the invention.
Figure 25:
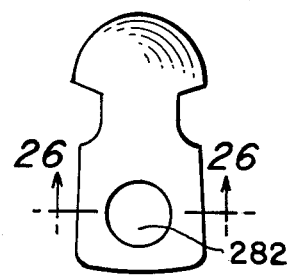
FIG. 25 is a plan view of a fifth variation of a coupling element broken away from a slide fastener stringer.
Figure 24:
FIG. 24 is cross-section view taken at line 24—24 in FIG. 23 of a broken-away portion of one leg of the coupling element.
Figure 26:
FIG. 26 is a cross-section view taken at line 26—26 in FIG. 25 of a broken-away portion of one leg of the coupling element.
Figure 27:
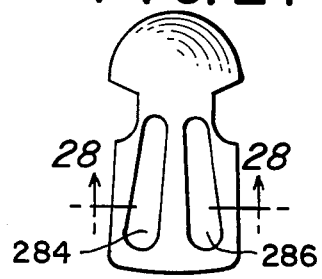
FIG. 27 is a plan view of a sixth variation of a coupling element broken away from a slide fastener stringer.
Figure 29:
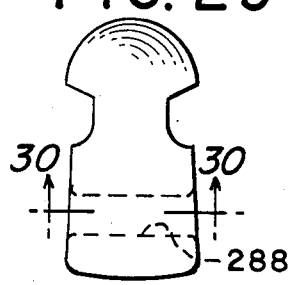
FIG. 29 is a plan view of a seventh variation of the coupling element broken away from a slide fastener stringer.
Figure 31:
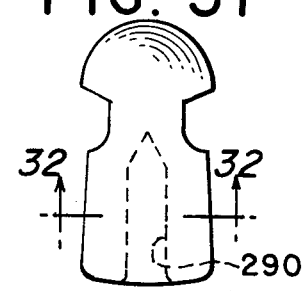
FIG. 31 is a plan view of an eighth variation of a coupling element broken away from a slide fastener stringer.
Figure 28:
FIG. 28 is a cross-section view taken at line 28—28 in FIG. 27 of a portion of one leg of the coupling element.
Figure 30:
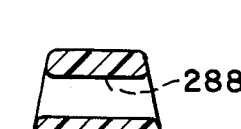
FIG. 30 is a cross-section view taken at line 30—30 in FIG. 29 of a broken-away portion of one leg of the coupling element.
Figure 32:
FIG. 32 is a cross-section view taken at line 32—32 in FIG. 31 of a broken-away portion of one leg of the coupling element.
Figure 33:
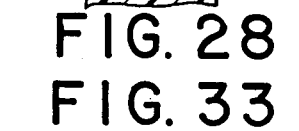
FIG. 33 is a plan view of a ninth variation of a coupling element broken away from a slide fastener stringer.
Figure 35:
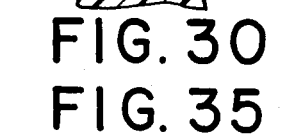
FIG. 35 is a plan view of a tenth variation of a coupling element broken away from a slide fastener stringer.
Figure 34:
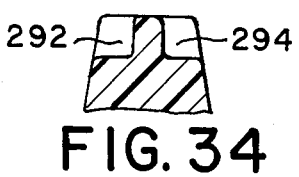
FIG. 34 is a cross-section view taken at line 34—34 of a broken-away portion of one leg of the coupling element of FIG. 33.
Figure 36:
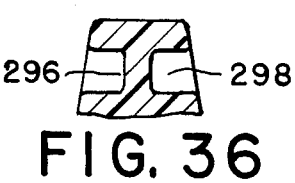
FIG. 36 is a cross-section view taken at line 36—36 in FIG. 35 of a broken-away portion of one leg portion of the coupling element shown in FIG. 35.

The recesses forming the rapidly cooled portions adjacent the longitudinal supporting means of the coupling elements may have various shapes as illustrated in the variations of FIGS. 23–36. In the variation of FIGS. 23 and 24, recesses 280 have a generally narrow elongated shape which is substantially rectangular rather than triangular. In the variation of FIGS. 25 and 26, circular recesses 282 are employed. A plurality of elongated recesses, such as the recesses 284 and 286 of FIGS. 27 and 28 can be employed in each leg portion in place of single recesses. Also the recesses may take the form of openings or bores as illustrated by the bore 288 extending transverse the leg in FIGS. 29 and 30 and the bore 290 extending longitudinally in the leg in FIGS. 31 and 32; the bore-like recesses of FIGS. 29-32 require injection molding apparatus employing core parts to form the bores. The recess 288 of FIGS. 29 and 30 opens in the side exterior surfaces of the legs while the bore 290 opens in the bottom or heel exterior surface of the leg. In FIGS. 33 and 34 recesses 292 and 294 are formed in each leg wherein the recesses 292 and 294 are formed as notches which open in both the top and side exterior surfaces of the leg. Recesses 296 and 298 in each leg are formed from the respective side exterior surfaces of each leg in the coupling element of FIGS. 35 and 36.

Since many variations, changes in detail and modifications can be made to the above described embodiments, it is intended that all matter in the foregoing description or shown in the accompanying drawings be interpreted as illustrative and not in a limiting sense.

What is claimed is:

1. A stringer for a slide fastener comprising
   a longitudinal supporting tape,
   a plurality of coupling elements injection molded on spaced portions of the supporting tape,
   each of the plurality of coupling elements being made from a polymer resin,
   each of the plurality of coupling elements including a head portion and first and second leg portions extending from the head portion in a generally parallel relationship,
   each of said first and second leg portions being molded on the respective spaced portion of the supporting tape to secure each coupling element thereto,
   each leg portion having an inner surface with the inner surfaces of said first and second leg portions facing each other,
   a recess in an outside surface of each leg portion reducing the leg portion's maximum thickness to form a recessed surface extending adjacent the supporting tape,
   the reduced thickness of each leg portion defining a rapidly cooled portion wherein such reduced thickness is less than 60% of the maximum thickness of the respective leg portion, and
   the rapidly cooled portion on each leg portion being adapted to decrease porosity therein to produce greater adherence and strength between each coupling element and the supporting tape.

2. A stringer as claimed in claim 1 wherein said reduced thickness of the rapidly cooled portion is less than 30% of the maximum thickness of the leg portion.

3. A stringer as claimed in claim 1 wherein each leg portion includes a ridge formed on each recessed surface within each recess.

4. A stringer as claimed in claim 1 wherein the recess formed in the leg portion is a triangular configuration.

5. A stringer as claimed in claim 1 wherein the recess of the leg portion is formed in an outer surface opposite to the supporting tape.

6. A stringer as claimed in claim 1 wherein the recess formed in the leg portion is formed in a side outside surfaces of the leg portion.

7. A stringer as claimed in claim 1 wherein there are included a plurality of the recesses in each leg portion.

8. A stringer as claimed in claim 1 wherein the recess defines walls of the leg portion extending the maximum thickness of the leg portion and surrounding the recess, said walls having a thickness parallel to the supporting tape less than 30% of a maximum dimension of the leg portion parallel to the supporting tape.

* * * * *